United States Patent Office.

LUCIA F. GRIFFIN, OF NEW YORK, N. Y.

Letters Patent No. 71,743, dated December 3, 1867.

IMPROVED MEDICATED BALSAM.

The Schedule referred to in these Letters Patent and making part of the same.

TO ALL WHOM IT MAY CONCERN:

Be it known that I, LUCIA F. GRIFFIN, of the city, county, and State of New York, have invented a new and improved Medicated Balsam Composition; and I do hereby declare that the following is a full, clear, and exact description thereof, which will enable others skilled in the art to make and use the same.

This invention relates to a new and useful medical composition for curing sprains, bruises, swellings, sore throats, pains in the side and limbs, weakness of the back, ague in the face and breast, rheumatism, gout, neuralgia, and other affections.

This improved balsamic compound consists of the following ingredients, viz, one quart of spirits of wine; four ounces gum-guaicum; two ounces hemlock gum; one-half ounce gum-camphor; one pint molasses.

In order to mix these ingredients, the gums are all put into the spirits of wine, which dissolves or cuts them, and the molasses is then added, and the whole thoroughly mixed together, when the composition is ready for use, and is an effectual remedy for the various maladies before mentioned. It is applied externally, by rubbing upon the afflicted parts, with the hand, enough of this composition to excite the skin and fill the pores thoroughly, as often as may be convenient, until a cure is effected. The proportions of the ingredients may be slightly varied, but I find by experience that the best effects are produced when they are strictly adhered to according to the preceding formula for making the balsam.

Having thus described my invention, what I claim as new, and desire to secure by Letters Patent, is—

A medicated balsam composition, of the ingredients herein named, as and for the purposes set forth.

LUCIA F. GRIFFIN.

Witnesses:
WM. F. McNAMARA,
ALEX. F. ROBERTS.